United States Patent
Kim et al.

(10) Patent No.: US 11,713,841 B2
(45) Date of Patent: Aug. 1, 2023

(54) HEATER FOR PIPE

(71) Applicant: TSC INC., Hwaseong-si (KR)

(72) Inventors: Oh Su Kim, Gyeonggi-do (KR); John Ho Kuk, Gyeonggi-do (KR)

(73) Assignee: TSC INC., Gyeonggi-do (KR)

( * ) Notice: Subject to any disclaimer, the term of this patent is extended or adjusted under 35 U.S.C. 154(b) by 432 days.

(21) Appl. No.: 16/793,106

(22) Filed: Feb. 18, 2020

(65) Prior Publication Data
US 2020/0292118 A1   Sep. 17, 2020

(30) Foreign Application Priority Data

Mar. 13, 2019 (KR) .................. 10-2019-0028848

(51) Int. Cl.
*F16L 53/38* (2018.01)
*H05B 3/44* (2006.01)

(52) U.S. Cl.
CPC ............... *F16L 53/38* (2018.01); *H05B 3/44* (2013.01); *H05B 2203/003* (2013.01)

(58) Field of Classification Search
CPC ..... F04D 13/04; G21C 15/182; G21C 15/243; G21D 1/02; G21D 1/04; G21D 3/04; Y02E 30/00; Y02E 30/30; F16L 53/38; F16L 59/024; F16L 59/025; H05B 2203/003; H05B 2203/014; H05B 2203/021; H05B 2203/022; H05B 3/44; H05B 3/58
USPC .......................................................... 219/535
See application file for complete search history.

(56) References Cited

U.S. PATENT DOCUMENTS

| | | | | |
|---|---|---|---|---|
| 4,281,238 A | * | 7/1981 | Noma | H05B 3/58 |
| | | | | 219/535 |
| 4,287,245 A | * | 9/1981 | Kikuchi | F16L 59/024 |
| | | | | 428/317.5 |
| 9,334,998 B2 | * | 5/2016 | Duttenhoefer | F16L 11/042 |

FOREIGN PATENT DOCUMENTS

| KR | 101602127 B1 | * | 3/2016 | ............... H05B 3/40 |
|---|---|---|---|---|
| KR | 101602127 B1 | | 3/2016 | |

OTHER PUBLICATIONS

16793106_2022-03-21_KR_101602127_B1_M-pdf.pdf (Year: 2016).*

* cited by examiner

Primary Examiner — Nathaniel E Wiehe
Assistant Examiner — Ket D Dang
(74) Attorney, Agent, or Firm — Finch & Maloney PLLC

(57) ABSTRACT

A heater for a pipe, includes a heater body part having a longitudinal cutting line formed in the entire thickness section to form a pair of longitudinal cutting planes in the entire length section, a heating wire installed in the heater body part, and a restraint operating part installed at the heater body part and restraining the pair of longitudinal cutting planes not to be spaced apart from each other. Each of the longitudinal cutting planes includes: a longitudinal outer cutting area disposed in a thickness direction from an outer surface of the heater body part, a longitudinal intermediate cutting area extending from the longitudinal outer cutting area in a circumferential direction of the heater body part, and a longitudinal inner cutting area extending from the longitudinal intermediate cutting area to reach the inner surface of the heater body part in the thickness direction of the heater body part.

16 Claims, 10 Drawing Sheets

HEATER FOR PIPE

BACKGROUND

1. Field

The present disclosure relates to a heater for a pipe, and more particularly, to a heater installed to surround a pipe to perform a heating or heat insulation function.

2. Description of Related Art

Pipes interworking with chemical material coating, deposition facilities or semiconductor manufacturing facilities need to be heated to an appropriate temperature to prevent by-products accumulated on inner walls thereof from being fixed or to compensate for temperature loss, and to this end, a heater for a pipe which surrounds a pipe to perform a heating or heat insulation function has been derived and used. In the present disclosure, an inner surface refers to a surface close to a pipe and an outer surface refers to a surface farther from the pipe when it is assumed that a heater for a pipe is installed on the pipe.

FIG. 10 is a perspective view of a heater for a pipe of a related art and FIG. 11 is a cross-sectional view of a heater for a pipe of the related art.

As shown in the drawings, the heater for a pipe of the related art includes a heater body part 110 provided in a straight tube shape to have an inner surface of a circular cross-section, and three heating wires 121 installed in the heater body part 110, and a restraint operating part 130 provided at the heater body part 110.

The heater body part 110 includes a heat insulation layer portion 115, a support layer portion 116 installed on an inner side of the heat insulation layer portion 115, an outer coating 117 provided on an outer surface of the heat insulation layer portion 115, and an inner coating 118 provided on an inner surface of the support layer portion 116.

The heat insulation layer portion 115 may be implemented as aramid felt or the like.

The support layer portion 116 is manufactured using a heat resistant material such as glass fiber cloth or the like.

The outer coating 117 and inner coating 118 are formed of polytetrafluoroethylene (PTFE).

One longitudinal cutting line 111 is formed in the entire length section of the heater body part 110.

The longitudinal cutting line 111 is formed in a straight line starting from an outer surface of the heater body part 110 to an inner surface thereof.

A pair of longitudinal cutting planes 112 is formed over the entire length section of the heater body part 110 by the longitudinal cutting line 111.

Each longitudinal cutting plane 112 forms a long rectangular planar shape disposed in a thickness direction of the heater body part 110.

Each heating wire 121 is installed so that both ends thereof are exposed to the outside of the heater body part 110.

Each heating wire 121 is fixed to the support layer portion 116 by a sewing thread (not shown) formed of a heat resistant material such as silica.

The heating wires 121 may be connected to each other in parallel, in series, or a combination of parallel and series. An amount of heat emitted from the heating wire 121 may be selected by varying a connection method of each heating wire 121.

The restraint operating part 130 has a female Velcro tape 132 and a male Velcro tape 131 provided on the outer coating 117 so as to be adjacent to the longitudinal cutting plane 112.

Meanwhile, according to the pipe for a heater of the related art, since the longitudinal cutting plane 112 formed in the heater body part 110 due to the longitudinal cutting line 111 has a long rectangular planar shape disposed along a thickness direction of the heater body part 110, heat loss through an area between the pair of longitudinal cutting planes 112 increases. Here, the heat loss is increased because a contact area between the pair of longitudinal cutting planes 112 is small when the area of each of the longitudinal cutting planes 112 is restrained by the restraint operating part 130 and heat movement through the pair of longitudinal cutting planes 112 is facilitated because there is no bent portion in the longitudinal cutting planes 112.

If the heat loss through an area between the pair of longitudinal cutting planes 112 increases, temperature uniformity of an outer surface of a pipe 201 is lowered. If the temperature uniformity of the outer surface of the pipe 201 is lowered, a problem that the by-products are fixed to a portion (area adjacent to the longitudinal cutting plane) of an inner wall of a pipe, or the like may arise.

Also, if the heat loss through an area between the pair of longitudinal cutting planes 112 increases, it may be difficult to install the heating wire 121 adjacent to the longitudinal cutting plane 112.

Related art documents include Korea Patent Registration No. 10-1602127 (dated Mar. 4, 2016, entitled "Heater for pipe"), which discloses a technology related to the pipe for a heater described above.

SUMMARY

An aspect of the present disclosure provides a heater for a pipe, capable of reducing heat loss that occurs between a pair of longitudinal cutting planes.

In an aspect, a heater for a pipe includes: a heater body part formed in a straight tube shape to have an inner surface having a circular cross-section and having a longitudinal cutting line formed in the entire thickness section to form a pair of longitudinal cutting planes in the entire length section; a heating wire installed in the heater body part; and a restraint operating part installed at the heater body part and restraining the pair of longitudinal cutting planes so as not to be spaced apart from each other, wherein each of the longitudinal cutting planes includes: a longitudinal outer cutting area disposed in a thickness direction from an outer surface of the heater body part, a longitudinal intermediate cutting area extending from the longitudinal outer cutting area in a circumferential direction of the heater body part, and a longitudinal inner cutting area extending from the longitudinal intermediate cutting area to reach the inner surface of the heater body part in the thickness direction of the heater body part.

The longitudinal cutting line may be provided in plurality, and the heating wire is installed at each circumferential segment when each portion of the heater body part divided by the longitudinal cutting line is the circumferential segment, so that a specific portion of the pipe may be heated more or less than other portions.

In another aspect, a heater for a pipe includes: a heater body part formed in a straight tube shape to have an inner surface having a circular cross-section, having a longitudinal cutting line formed in the entire thickness section to form a pair of longitudinal cutting planes in the entire length section, and having a circumferential cutting line formed in the entire thickness section to form a pair of circumferential cutting planes in the entire circumferential section; a heating wire installed in the heater body part; and a restraint operating part installed at the heater body part and restraining the pair of longitudinal cutting planes so as not to be spaced apart from each other, wherein each of the longitudinal cutting planes includes: a longitudinal outer cutting area (surface) disposed in a thickness direction from an outer surface of the heater body part, a longitudinal intermediate cutting area (surface) extending from the longitudinal outer cutting area (surface) in a circumferential direction of the heater body part, and a longitudinal inner cutting area (surface) extending from the longitudinal intermediate cutting area (surface) to reach the inner surface of the heater body part in the thickness direction of the heater body part, and wherein each of the circumferential cutting planes includes: a circumferential outer cutting area (surface) disposed in the thickness direction from the outer surface of the heater body part, a circumferential intermediate cutting area (surface) extending from the circumferential intermediate cutting area (surface) in a length direction of the heater body part, and a circumferential inner cutting area (surface) extending from the circumferential intermediate cutting area (surface) to reach the inner surface of the heater body part in the thickness direction of the heater body part, and wherein the heating wire is installed at each longitudinal segment when each portion of the heater body part divided by the circumferential cutting line is the longitudinal segment.

In another aspect, a heater for a pipe includes: a heater body part formed in a straight tube shape to have an inner surface having a circular cross-section, having a longitudinal cutting line formed in the entire thickness section to form a pair of longitudinal cutting planes in the entire length section, and having a circumferential cutting line formed in the entire thickness section to form a pair of circumferential cutting planes in the entire circumferential section; a heating wire installed in the heater body part; and a restraint operating part installed at the heater body part and restraining the pair of longitudinal cutting planes so as not to be spaced apart from each other, wherein the longitudinal cutting line is provided in plurality and each of the longitudinal cutting planes includes: a longitudinal outer cutting area disposed in a thickness direction from an outer surface of the heater body part, a longitudinal intermediate cutting area extending from the longitudinal outer cutting area in a circumferential direction of the heater body part, and a longitudinal inner cutting area extending from the longitudinal intermediate cutting area to reach the inner surface of the heater body part in the thickness direction of the heater body part, and wherein each of the circumferential cutting planes includes: a circumferential outer cutting area disposed in the thickness direction from the outer surface of the heater body part, a circumferential intermediate cutting area extending from the circumferential intermediate cutting area in a length direction of the heater body part, and a circumferential inner cutting area extending from the circumferential intermediate cutting area to reach the inner surface of the heater body part in the thickness direction of the heater body part, and wherein the heating wire is installed at each bidirectional segment when each portion of the heater body part divided by the circumferential cutting line is the bidirectional segment.

The heating wire may be installed on a more inner side than the longitudinal intermediate cutting area so as to reduce heat loss that occurs in the thickness direction of the pipe.

The restraint operating part may include a female Velcro tape and a male Velcro tape installed to face each other in the longitudinal intermediate cutting area, so that the restraint operating part is not exposed to the outside.

In addition, the heater body part may be formed of a material which is bendable in a direction in which curvature is reduced, so that a heater that may be used in various types of pipes having different diameters of outer surfaces using one type of longitudinal segment, circumferential segment, or bidirectional segment.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, the present disclosure will be described in detail with reference to the accompanying drawings.

Figure 1:
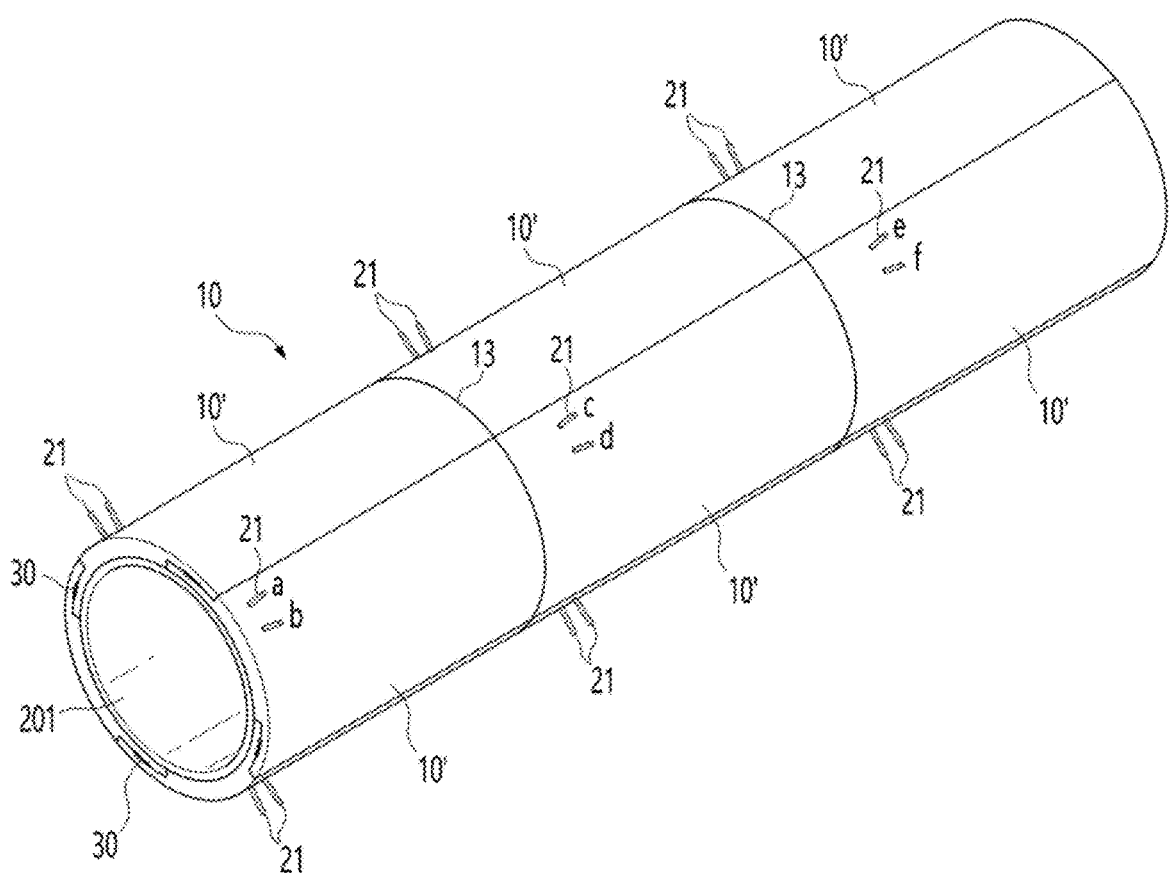
FIG. 1 is a view showing a state in which a heater for a pipe is installed on a pipe according to an embodiment of the present disclosure.
Figure 2:
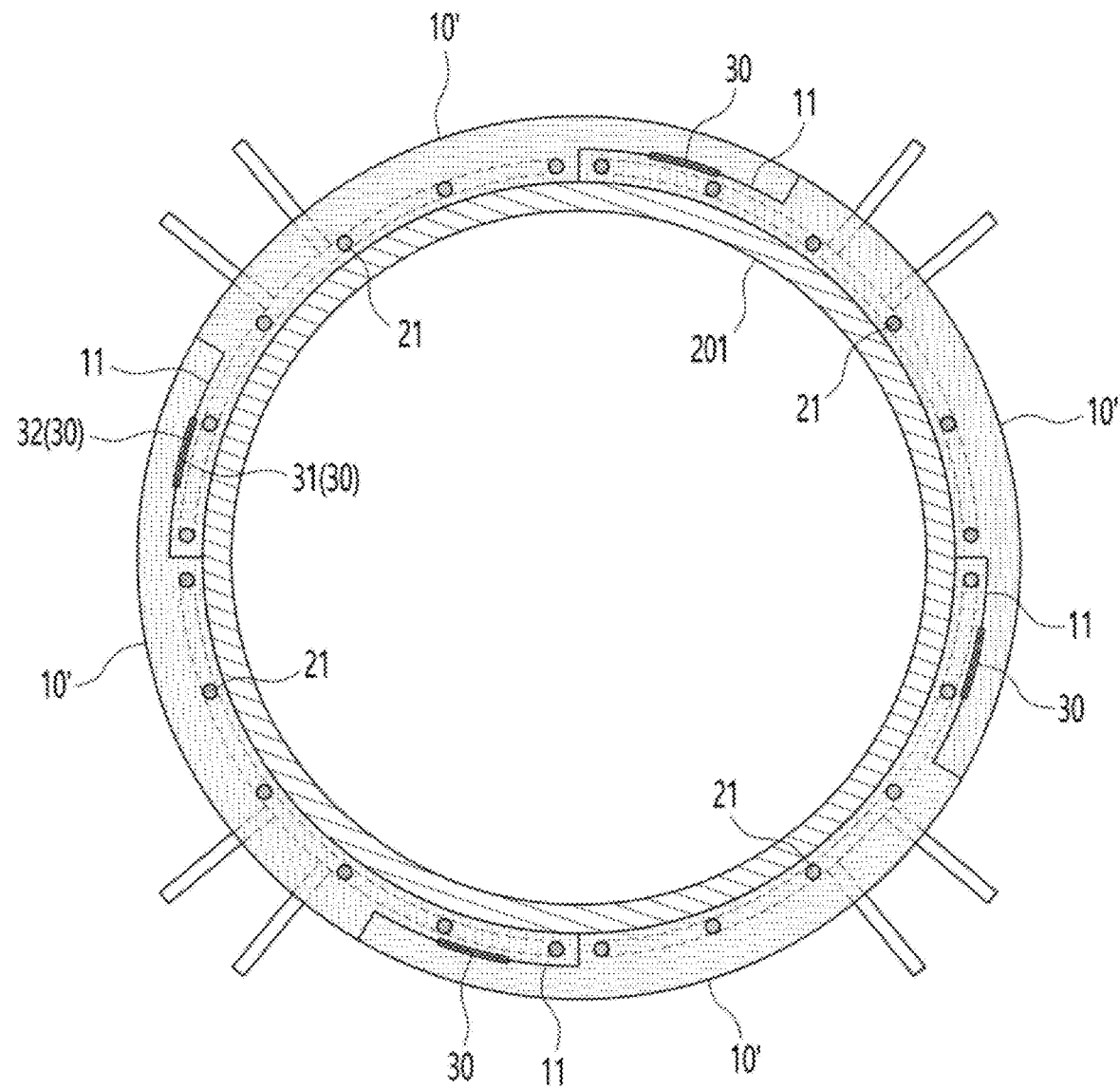
FIG. 2 is a cross-sectional view of a heater for a pipe according to an embodiment of the present disclosure.
Figure 3:
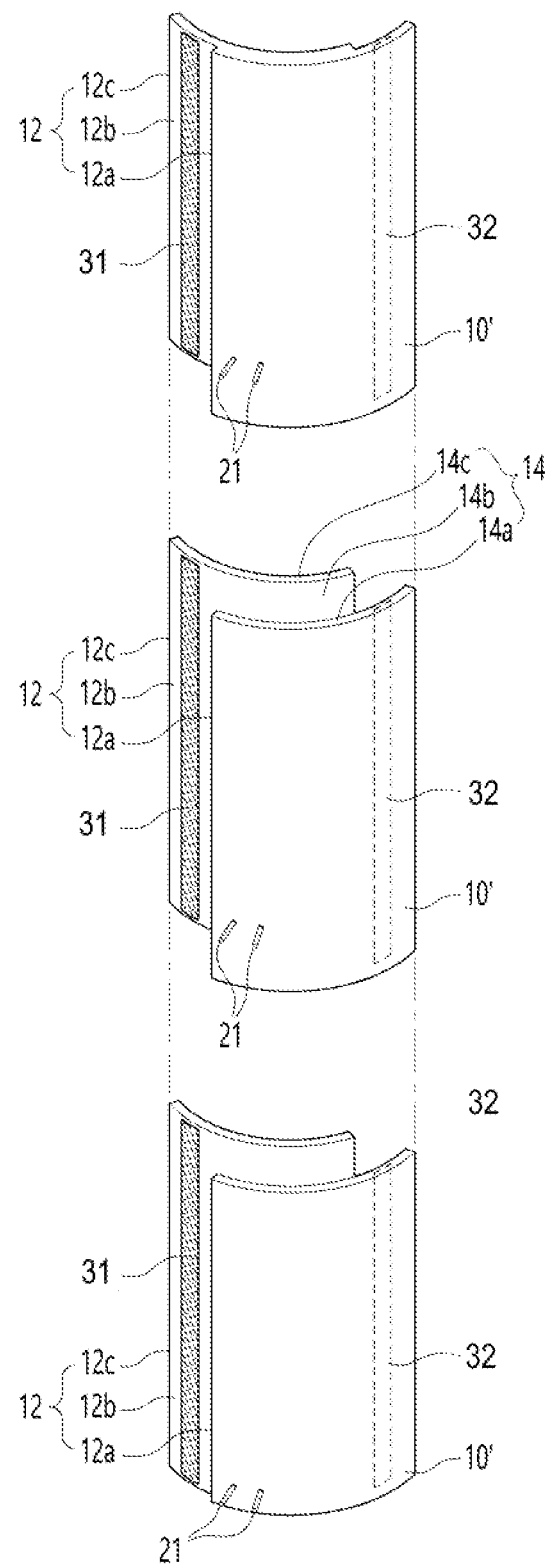
FIG. 3 is a view showing bidirectional segments of a heater for a pipe according to an embodiment of the present disclosure.
Figure 4:
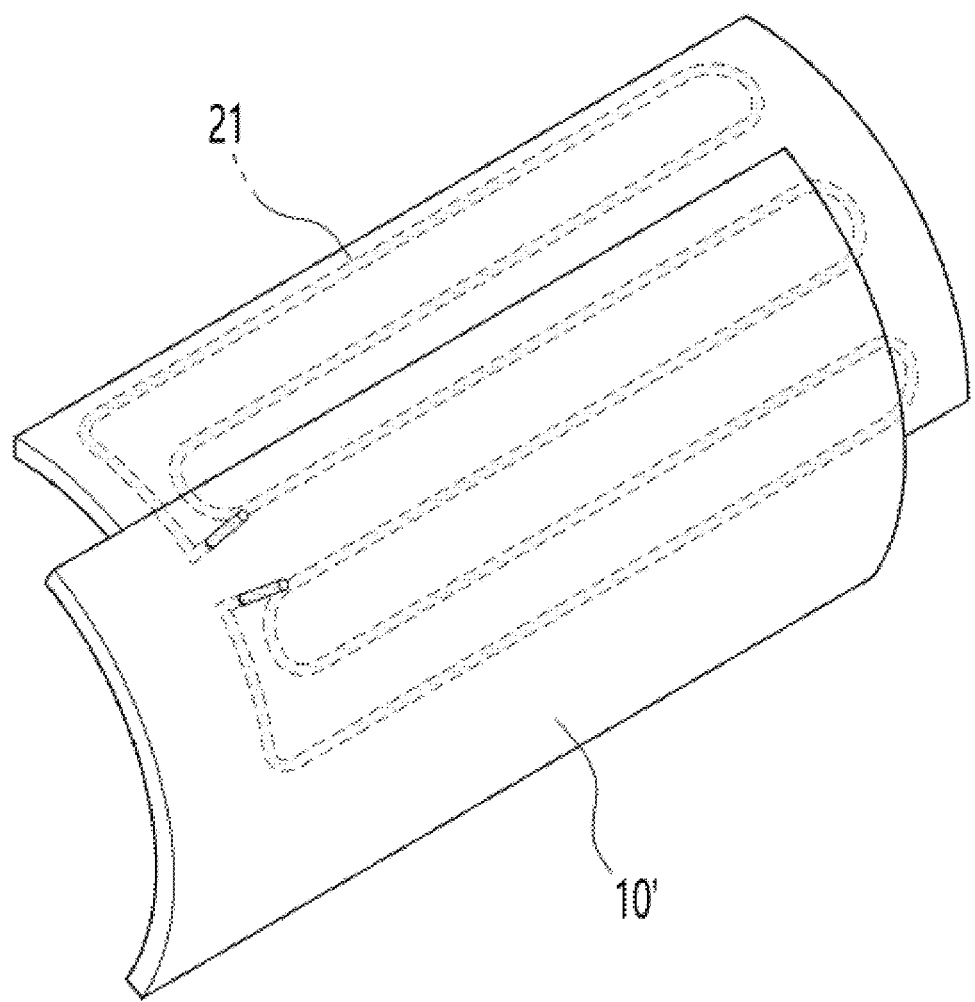
FIG. 4 is a view showing a pattern of a heating wire according to an embodiment of the present disclosure.
Figure 5:
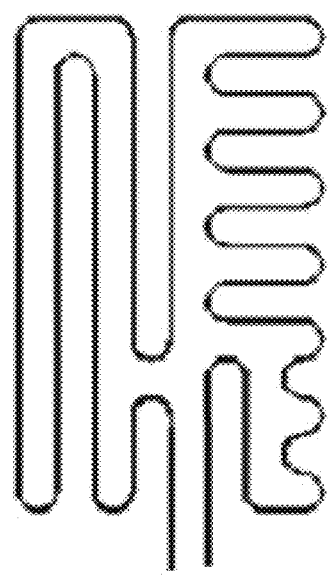
FIGS. 5 and 6 are views showing other forms of a heating wire pattern according to an embodiment of the present disclosure, respectively.
Figure 6:
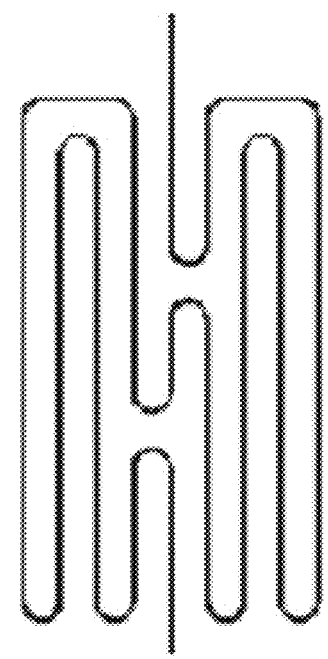
Figure 7:
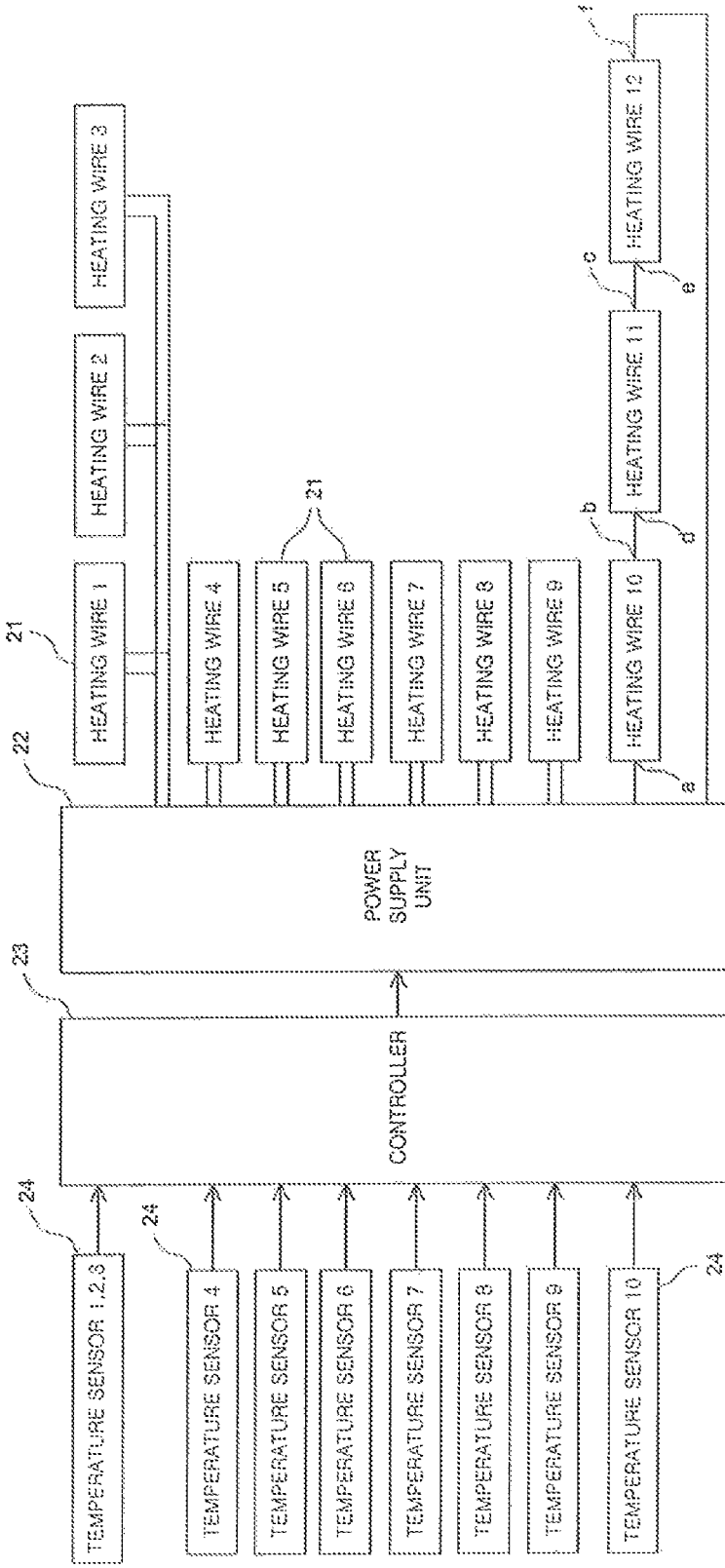
FIG. 7 is a view showing a connection state between heating wires and a power supply unit according to an embodiment of the present disclosure.
Figure 8:
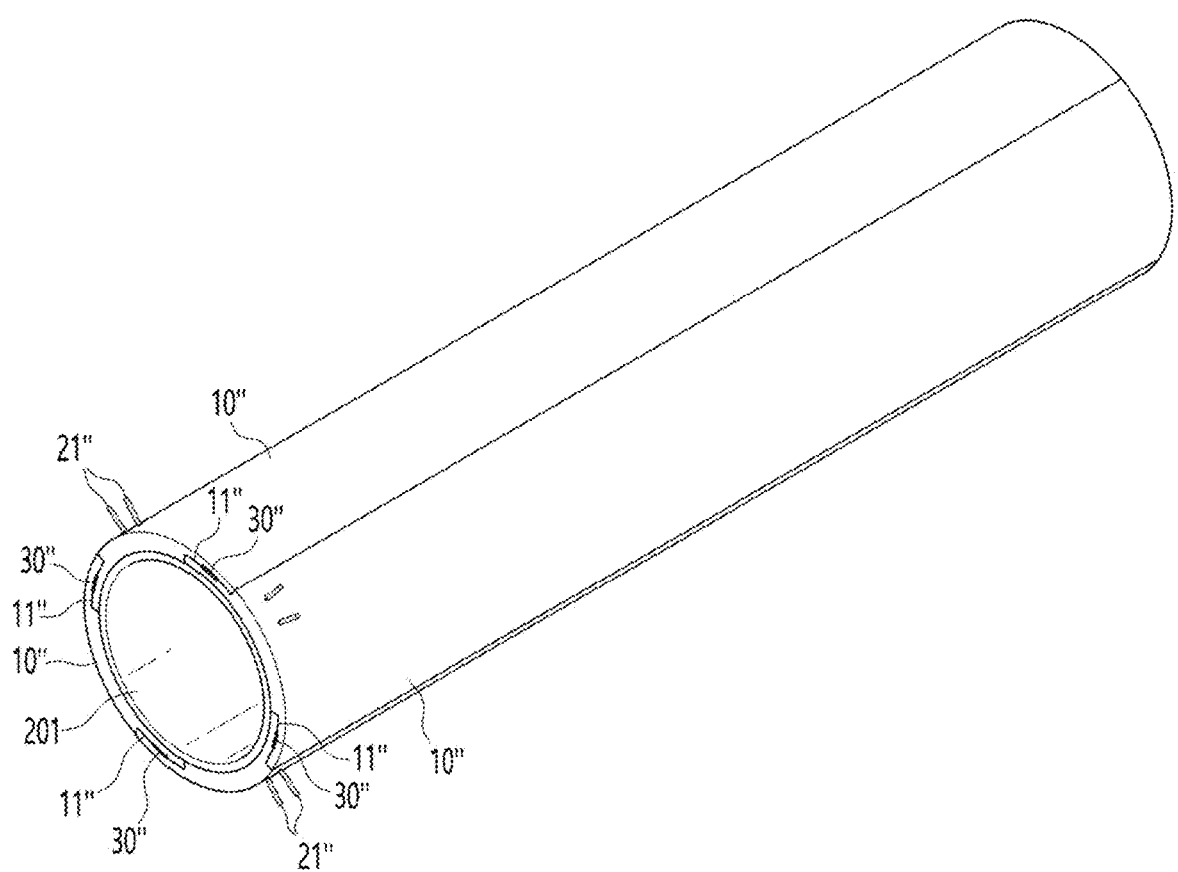
FIG. 8 is a view showing a state in which a heater for a pipe according to another embodiment of the present disclosure is installed on a pipe.
Figure 9:
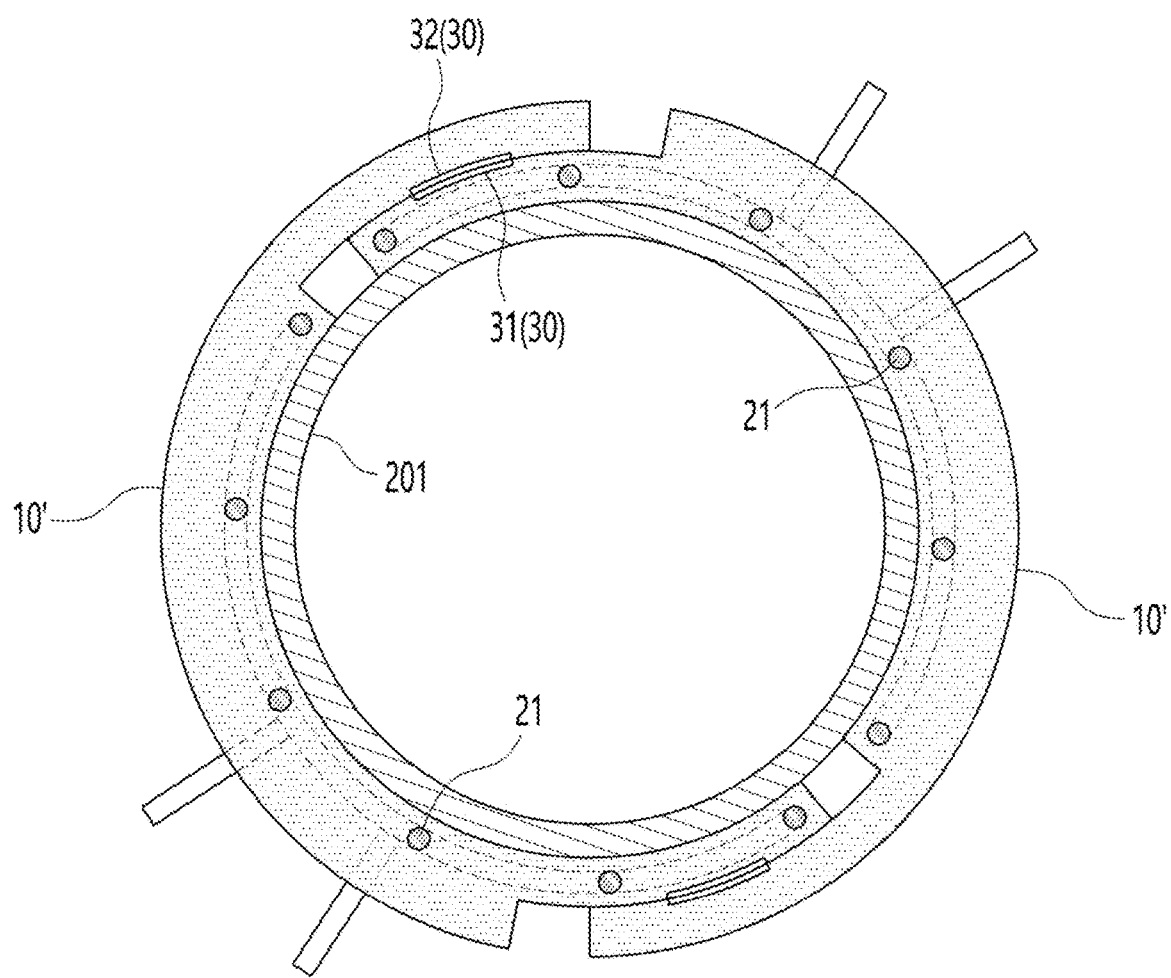
FIG. 9 is a view illustrating an effect of the present disclosure.
Figure 10:
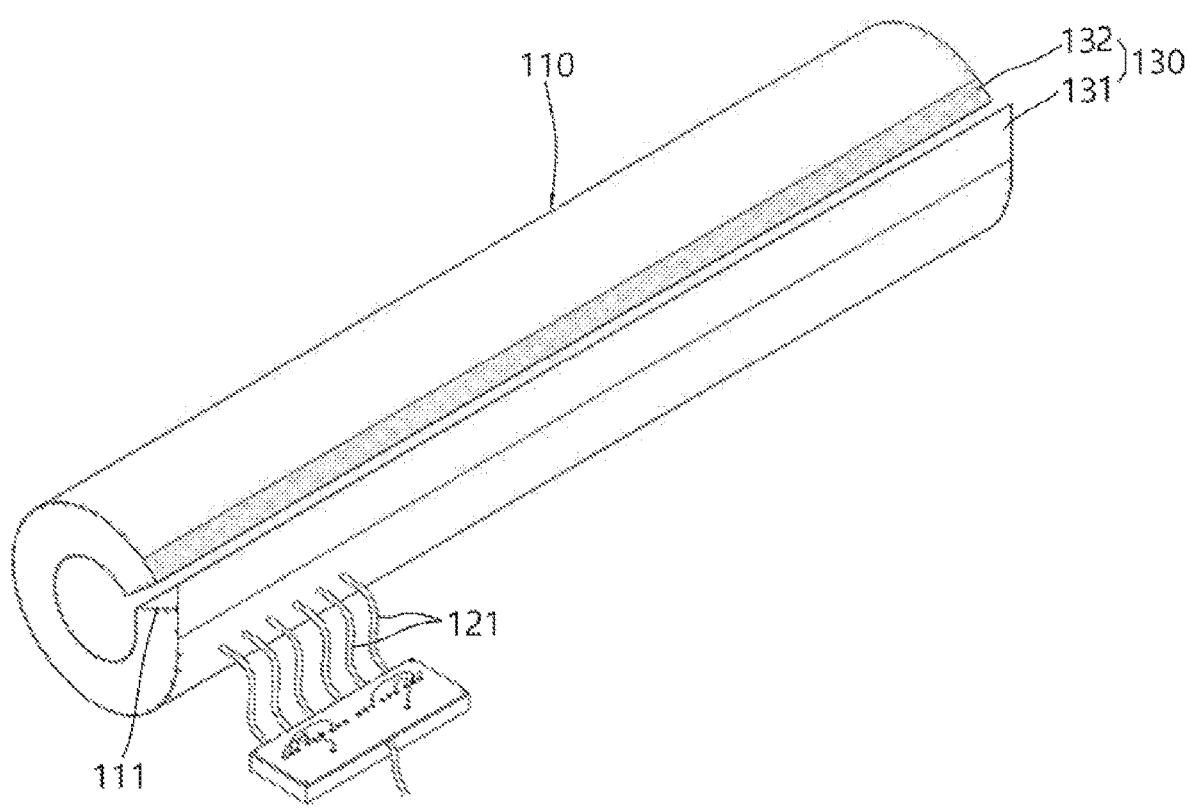
FIG. 10 is a perspective view of a heater for a pipe of the related art.

FIG. 1 is a view showing a state in which a heater for a pipe according to an embodiment of the present disclosure is installed on a pipe and FIG. 2 is a cross-sectional view of a heater for a pipe according to an embodiment of the present disclosure, FIG. 3 is a view showing bidirectional segments of a heater for a pipe according to an embodiment of the present disclosure, FIG. 4 is a view showing a pattern of a heating wire according to an embodiment of the present disclosure, FIGS. 5 and 6 are views showing other forms of a heating wire pattern according to an embodiment of the present disclosure, respectively, FIG. 7 is a view showing a connection state between heating wires and a power supply unit according to an embodiment of the present disclosure, FIG. 8 is a view showing a state in which a heater for a pipe according to another embodiment of the present disclosure is installed on a pipe, and FIG. 9 is a view illustrating an effect of the present disclosure.

As shown in these drawings, a heater for a pipe according to an embodiment of the present disclosure includes a heater body part 10 provided in a straight tube shape to have an inner surface having a circular cross-section, a heating wire 21 provided in the heat body part 10, and a restraint operating part 30 provided at the heater body part 10.

The heater body part 10 is formed of a material having flexibility such as silicon rubber. The heating wire 21 may be embedded in an insertion manner when the heater body part 10 is manufactured.

In the heater body part 10, four longitudinal cutting lines 11 and two circumferential cutting lines 13 are provided in the entire thickness section.

A pair of longitudinal cutting planes 12 is formed in the entire longitudinal section by each longitudinal cutting line 11.

Each longitudinal cutting plane 12 includes a longitudinal outer cutting area (surface) 12a disposed along a thickness direction from an outer surface of the heater body part 10, a longitudinal intermediate cutting area (surface) 12b extending from the longitudinal outer cutting area (surface) 12a in a circumferential direction of the heat body part 10, and a longitudinal inner cutting area (surface) 12c extending from the longitudinal intermediate cutting area (surface) 12b in the thickness direction of the heater body part 10 to reach an inner surface of the heater body part 10.

A pair of circumferential cutting planes 14 is formed in the entire circumferential section by each circumferential cutting line 13.

Each circumferential cutting plane 14 includes a circumferential outer cutting area (surface) 14a disposed in the thickness direction from the outer surface of the heater body part 10, a circumferential intermediate cutting area (surface) 14b extending from the circumferential outer cutting area (surface) 14a in a length direction of the heater body part 10, and a circumferential inner cutting area (surface) 14c extending from the circumferential intermediate cutting area (surface) 14b to reach the inner surface of the heater body part 10 in the thickness direction of the heater body part 10.

The heater body part 10 is divided in the circumferential direction by the four longitudinal cutting lines 11 and is divided in the length direction by the two circumferential cutting lines 13. For convenience of explanation, each portion of the heater body part 10 divided by the longitudinal cutting lines 11 and the circumferential cutting lines 13 will be referred to as a bidirectional segment 10'.

The bidirectional segments 10' may be installed on an outer surface of a pipe 201 individually one by one or a plurality of the bidirectional segments 10' may be installed on the outer surface of the pipe 201 in a mutually coupled state through the restraint operating part 30.

The heating wire 21 is installed in each of the bidirectional segments 10' so that both ends thereof are exposed to the outside of the heater body part 10. The heating wire 21 is installed on a more inner side than the longitudinal intermediate cutting area 12b. Here, the term "inner side" means that the heating wire 21 is disposed closer to the pipe 201 than the longitudinal intermediate cutting area 12b is, which simply represents a relative positional relation of the heating wire and the longitudinal intermediate cutting area 12b with respect to the pipe 201 and an installation area of the heating wire 21 is not limited to an area opposing the longitudinal intermediate cutting area 12b.

The heating wire 21 may be installed in a zigzag form as shown in FIG. 4 or may be installed in other forms such as shown in FIGS. 5 and 6.

Each heating wire 21 is electrically connected to a power supply unit 22 for a resistance heating operation.

The heating wires 21 may be individually connected to the power supply unit 22, all the heating wires 21 may be connected in series or in parallel to the power supply unit 22, or some of the heating wires 21 may be connected in series to the power supply unit 22, some of the heating wires 21 may be connected in parallel to the power supply unit 22, and the other remaining heating wires may be individually connected to the power supply unit 22. That is, the heating wires 21 may be connected to the power supply unit 22 in various forms.

In FIG. 7, it is illustrated that heating wires installed at six bidirectional segments 10' out of 12 bidirectional segments 10' are individually connected to the power supply unit 22, heating wires installed at three other bidirectional segments 10' are connected in parallel to the power supply unit 22, and heating wires installed at the other three bidirectional segments 10' are connected in series to the power supply unit 22.

A method of connecting three bidirectional segments 10' in series to the power supply unit 22 will be described with reference to FIGS. 1 and 7. For convenience of description, both ends of a first bidirectional segment 10' will be referred to as "a" and "b", both ends of a second bidirectional segment 10' will be referred to as "c" and "d", and a third bidirectional segment 10' will be referred to as "e" and "f".

First, the end "b" of the first bidirectional segment 10' and the end "d" of the second bidirectional segment 10' are connected to each other, and the end "c" of the second bidirectional segment 10' and the end "e" of the third bidirectional segment 10' are connected to each other.

Next, the end "a" of the first bidirectional segment 10' and the end "f" of the third bidirectional segment 10' are connected to the power supply unit 22.

In a state in which the heating wires 21 are connected to the power supply unit 22 as shown in FIG. 7, the resistance heating operation of each heating wire 21 may be turned on or off by turning on or off an electrical connection between the power supply unit 22 and each heating wire 21 through a controller 23.

The controller 23 determines whether or not a heating operation of the heating wire 21 is normally performed based on a temperature detection value input from a temperature sensor 24 installed at the bidirectional segment 10', and if the heating operation is not performed normally, alerting may be provided through a display device. The temperature sensor 24 may be installed only at one of the three bidirectional segments 10' corresponding to the heating wire 21 connected in parallel with the power supply unit 22.

In addition, the controller 23 may select the amount of heat emitted from the heating wire 21 by controlling the power supply unit 22 so that a magnitude of a current flowing in the heating wire 21 is varied based on the temperature detection value input from the temperature sensor 24.

The restraint operating part 30 has a female Velcro tape 32 and a male Velcro tape 31 provided at the bidirectional segment 10' so as to face each other in the longitudinal intermediate cutting area 12b.

The female Velcro tape 32 and the male Velcro tape 31 are installed on each bidirectional segment 10'.

When the female Velcro tape 32 and the male Velcro tape 31 are brought into contact with each other, the pair of longitudinal cutting planes 12 may be restrained so as not to be spaced apart from each other.

Meanwhile, in the embodiment described above, the heater body part 10 is configured to be divided by the plurality of longitudinal cutting lines 11 and the plurality of circumferential cutting lines 13, but the present disclosure may also be implemented such that the formation of the circumferential cutting line 13 is omitted and the heater body part 10 is divided only by the plurality of longitudinal cutting lines 11 as shown in FIG. 8.

FIG. 8 is a view showing a state in which a heater for a pipe according to another embodiment of the present disclosure is installed on a pipe.

The heater for a pipe according to another embodiment of the present disclosure is different from the heater for a pipe according to an embodiment of the present disclosure (the heater body part is divided by the four longitudinal cutting lines and two circumferential cutting lines), in that the heater body part is divided by four longitudinal cutting lines 11".

Each longitudinal cutting line 11" forms a pair of longitudinal cutting planes (See "12" of FIG. 3) in the entire length section.

Each longitudinal cutting plane includes a longitudinal outer cutting area (See "12a" of FIG. 3) disposed in a thickness direction from an outer surface of the heater body part, a longitudinal intermediate cutting area (See "12b" of FIG. 3) extending in a circumferential direction of the heater body part from the longitudinal outer cutting area, and a longitudinal inner cutting area (See "12c" of FIG. 3) extending from the longitudinal intermediate cutting area to reach an inner surface of the heater body part in the thickness direction of the heater body part.

The heater body part is divided in the circumferential direction by the plurality of longitudinal cutting lines 11". For convenience of description, each portion of the heater body part divided by the longitudinal cutting line 11" will be referred to as a circumferential segment 10".

A heating wire 21" is installed in each of the circumferential segment 10" so that both ends thereof are exposed to the outside of the heater body part.

A restraint operating part 30" has a male Velcro tape (See "31" of FIG. 3) and a female Velcro tape (See "32" of FIG. 3) provided in the longitudinal intermediate cutting area.

In the embodiment described above, the heater body part is divided by the plurality of longitudinal cutting lines, but the present disclosure may also be implemented such that one longitudinal cutting line is provided and the heater body part is divided by a plurality of circumferential cutting lines.

The heater body part is divided into a plurality of longitudinal segments by the circumferential cutting lines.

In addition, in the above embodiment, the heater body part is divided by the plurality of longitudinal cutting lines or circumferential cutting lines, but the present disclosure may also be implemented such that the circumferential cutting line is not formed and only one longitudinal cutting line is formed at the heater body part.

In addition, in the embodiment described above, the restraint operating part is configured using Velcro tape, but the restraint operating part may also be configured using any other unit such as a snap button or the like.

Figure 11:
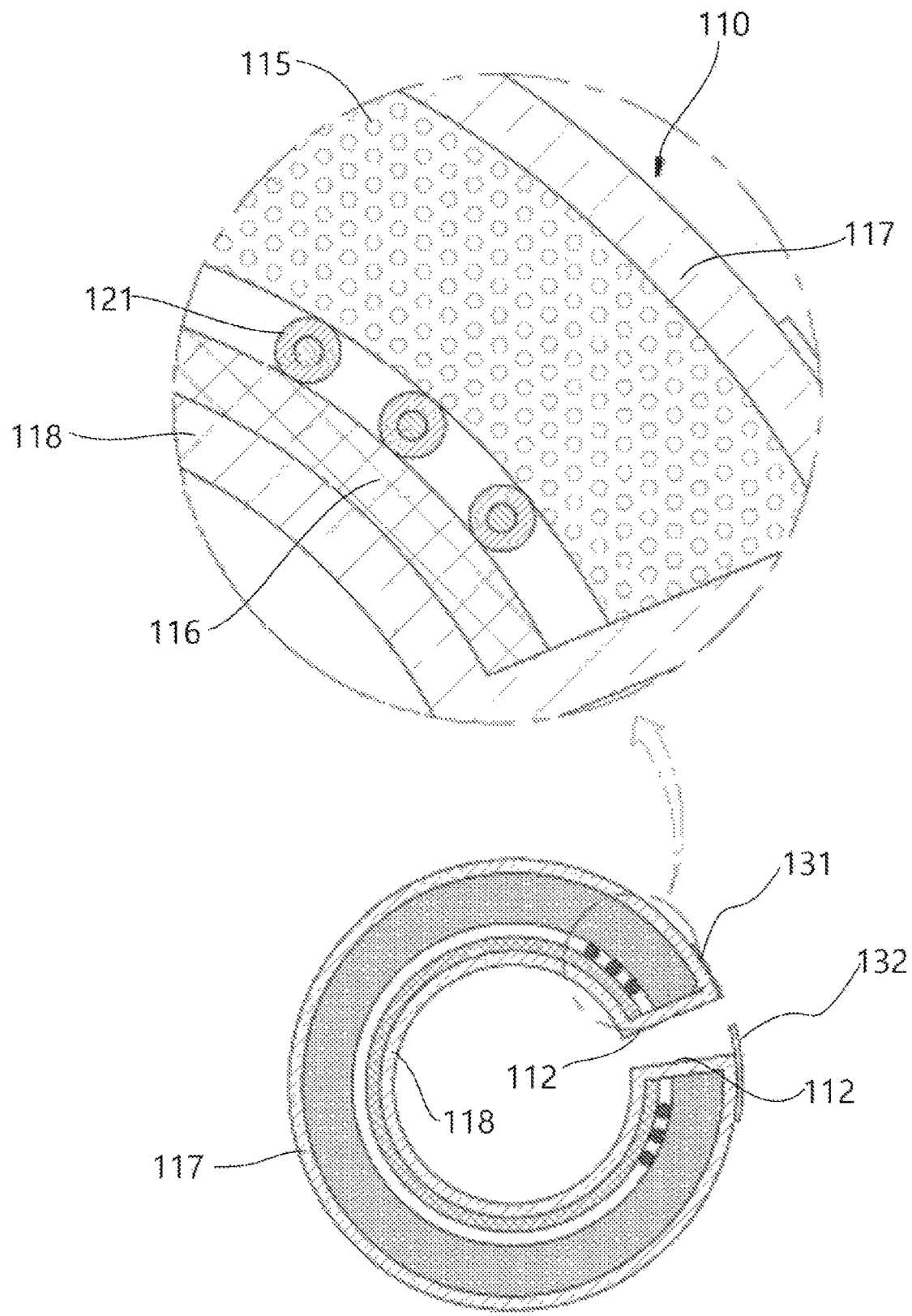
FIG. 11 is a cross-sectional view of the heater for a pipe of the related art.

In addition, in the embodiment described above, the heating wire 21 is configured to be embedded in the heater body part 10 in an insertion manner, but the present disclosure may also be implemented by configuring the heater body part to have the same structure as the heater for a pipe of the related art shown in FIG. 11.

As described above, according to an embodiment of the present disclosure, the longitudinal cutting plane 12 including the longitudinal outer cutting area 12a disposed in the thickness direction from the outer surface of the heater body part 10, the longitudinal intermediate cutting area 12b extending from the longitudinal outer cutting area 12a in the circumferential direction of the heater body part 10, and the longitudinal inner cutting area 12c extending from the longitudinal intermediate cutting area 12b to reach the inner surface of the heater body part 10 in the thickness direction of the heater body part 10 is formed by the longitudinal cutting lines 11, thereby reducing heat loss through an area between the pair of longitudinal cutting planes 12. Here, heat loss is reduced because the area of each longitudinal cutting plane 12 is increased to increase a contact area between the pair of longitudinal cutting planes 12 when the longitudinal cutting planes 12 are restrained by the restraint operating part 30 and it is difficult for heat to move between the pair of longitudinal cutting planes 12 due to two bent portions provided at the longitudinal cutting planes 12.

When heat loss through an area between the pair of longitudinal cutting planes 12 is reduced, temperature uniformity of the outer surface of the pipe 201 is improved and the heating wire 21 may be installed adjacent to the longitudinal cutting planes 12.

The circumferential cutting plane 14 including the circumferential outer cutting area 14a disposed in the thickness direction from the outer surface of the heater body part 10, the circumferential intermediate cutting area 14b extending from the circumferential outer cutting area 14a in the length direction of the heater body part 10, and the circumferential inner cutting area 14c extending from the circumferential intermediate cutting area 14b to reach the inner surface of the heater body part 10 in the thickness direction is formed by the circumferential cutting lines 13, thereby reducing heat loss through an area between the pair of circumferential cutting planes 14.

In addition, since the heating wire 21 is installed on each of the bidirectional segment 10', the circumferential segment 10", or longitudinal segment, a specific portion (portion facing a heating device or cooling device or exposed to the outside) of the pipe 201 may be heated more or less than other portions.

In addition, since the heating wire 21 is installed on the inner side than the longitudinal intermediate cutting area 12b, heat loss that may occur in the thickness direction of the pipe 201 may be reduced (air gap in the longitudinal intermediate cutting area functions to block heat).

In addition, since the restraint operating part 30 is configured to include the female Velcro tape 32 and the male Velcro tape 31 installed to face each other at the longitudinal intermediate cutting area 12b, the restraint operating part 30 is not exposed to the outside.

In addition, since the heater body part 10 is formed of a material that may be bent in a direction in which curvature is reduced, a heater that may be used in various types of pipes 201 having different diameters of outer surfaces may be manufactured using the one type of bidirectional segments 10', circumferential segments 10", or longitudinal segments. In FIG. 9, the heater for a pipe using two out of the four bidirectional segments 10' used for the heater for a pipe according to an embodiment of the present disclosure shown in FIG. 1 is illustrated.

As described above, according to the embodiment of the present disclosure, the longitudinal cutting plane including the longitudinal outer cutting area disposed in the thickness direction from the outer surface of the heater body part, the longitudinal intermediate cutting area extending from the longitudinal outer cutting area in the circumferential direction of the heater body part, and the longitudinal inner cutting area extending from the longitudinal intermediate cutting area to reach the inner surface of the heater body part in the thickness direction of the heater body part is formed by the longitudinal cutting lines, thereby reducing heat loss through an area between the pair of longitudinal cutting planes. Here, heat loss is reduced because the area of each longitudinal cutting plane is increased to increase a contact area between the pair of longitudinal cutting planes when the longitudinal cutting planes are restrained by the restraint operating part and it is difficult for heat to move between the pair of longitudinal cutting planes due to two bent portions provided at the longitudinal cutting planes.

While embodiments have been shown and described above, it will be apparent to those skilled in the art that modifications and variations could be made without departing from the scope of the present disclosure as defined by the appended claims.

What is claimed is:

1. A heater fora pipe, the heater comprising:
a heater body part extending axially in a longitudinal direction, and having a longitudinal cutting plane, a radially inner surface and a radially outer surface and the heater body part being formed of a plurality of circumferential segments that are formed of a flexible material; each of the circumferential segments comprises:
a heating wire installed within the heater body part; and
a restraint operating part configured to couple the circumferential segments to restrain the heater body part in a cylindrical shape,
wherein the longitudinal cutting plane extends in a radial thickness direction from the inner surface to the outer surface of the heater body part and includes:
a longitudinal outer cutting area disposed inwardly in the thickness direction from the outer surface of the heater body part,
a longitudinal intermediate cutting area extending from the longitudinal outer cutting area in a circumferential direction of the heater body part, the restraint operating part being installed on the longitudinal intermediate cutting area, and
a longitudinal inner cutting area extending from the longitudinal intermediate cutting area to the inner surface of the heater body part in the thickness direction of the heater body part,
wherein the circumferential segments are coupled to each other such that the heating wire of each of the circumferential segments is spaced from each other in the circumferential direction and specific circumferential portions of the pipe are heatable more or less than other circumferential portions of the pipe.

2. The heater of claim 1, wherein
the restraint operating part is installed on the longitudinal intermediate cutting area in the circumferential direction between the longitudinal outer and the inner cutting areas.

3. The heater of claim 2, wherein
the restraint operating part includes a female touch fastener (Velcro®) tape and a male touch fastener (Velcro®) tape installed to face each other at the longitudinal intermediate cutting area.

4. A heater for a pipe, the heater comprising:
a heater body part extending axially in a longitudinal direction and including a plurality of circumferential segments, and the heater body part having a radially inner surface and a radially outer surface;
wherein each of the circumferential segments comprising:
a heating wire installed therein; and
first and second restraint operating parts configured to fasten the circumferential segments to each other,
first and second longitudinal cutting planes that are located opposite each other in a circumferential direction, each of the first and the second longitudinal cutting planes includes:
a longitudinal outer cutting area disposed in a radial thickness direction inwardly from the outer surface,
a longitudinal intermediate cutting area extending from the longitudinal outer cutting area in a circumferential direction of the heater body part, the first and the second restrain operating parts each being secured to the intermediate cutting area of the corresponding longitudinal cutting plane, and
a longitudinal inner cutting area extending inwardly from the longitudinal intermediate cutting area to reach the inner surface of the heater body part in the thickness direction of the heater body part,
wherein the outer, the intermediate and the inner cutting areas of the first and the second longitudinal cutting planes are configured such that the first longitudinal cutting plane of one of the circumferential segments mates with the second longitudinal cutting plane of an adjacent circumferential segment, and the first restraint operating part of the circumferential segment couples the second restraint operating part of the adjacent circumferential segment and fastens the circumferential segments to each other.

5. The heater of claim 4, wherein
the first and the second restraint operating parts are installed on the longitudinal intermediate cutting areas of the first and the second longitudinal cutting planes, respectively, in the circumferential direction between the outer and the inner cutting areas.

6. The heater of claim 4, wherein
the first and the second restraint operating parts include a female touch (Velcro®) fastener tape and a male touch fastener (Velcro®) tape installed to face each other at the longitudinal intermediate cutting areas.

7. The heater of claim 4, wherein
the circumferential segments are two or four segments having the same shape.

8. The heater of claim 4, wherein
the heating wire is installed within each of the circumferential segments.

9. The heater of claim 4, wherein
the heating wire is installed, in the thickness direction on a radially inner side in relation to the longitudinal intermediate cutting area.

10. The heater of claim 4, wherein
the circumferential segments are formed of a flexible material.

11. A heater fora pipe, the heater comprising:
a heater body part defining a longitudinal axis, and the heater body part having a radially inner surface, a radially outer surface, a longitudinal cutting plane and a circumferential cutting plane and including a plurality of bi-directional segments;

a heating wire installed within the heater body part; and a restraint operating part configured to restrain the heater body part in a cylindrical shape, wherein the longitudinal cutting plane extends in a radial thickness direction of the heater body part from the radially inner surface to the radially outer surface of the heater body part and includes:

a longitudinal outer cutting surface extending radially inward in the thickness direction from the radially outer surface, a longitudinal intermediate cutting surface extending from the longitudinal outer cutting surface in a circumferential direction of the heater body part, and a longitudinal inner cutting surface extending radially inward in the thickness direction from the longitudinal intermediate cutting surface to the radially inner surface of the heater body part, and wherein the circumferential cutting plane extends in the thickness direction of the heater body part from the radially inner surface to the radially outer surface of the heater body part and includes:

a circumferential outer cutting surface extending radially inward in the thickness direction from the radially outer surface, a circumferential intermediate cutting surface extending from the circumferential outer cutting surface in a longitudinal direction of the heater body part, and a circumferential inner cutting surface extending radially inward in the thickness direction from the circumferential intermediate cutting surface to the radially inner surface of the heater body part, and wherein each of the plurality of bi-directional segments comprises:

first and second longitudinal cutting planes located opposite each other in the circumferential direction, and first and second circumferential cutting planes located opposite each other in the longitudinal direction;

the longitudinal intermediate cutting surface of each of the first and the second longitudinal cutting planes having a restraint operating part fixed thereto; and the restraint operating part of the first longitudinal cutting plane of the bi-directional segments engaging the restraint operating part of the second longitudinal cutting planes of the bi-directional segments such that the bi-directional segments couple each other in the circumferential direction and form a cylindrical longitudinal segment of the heater body part.

12. The heater of claim 11, wherein
the restraint operating part is installed on the longitudinal intermediate cutting surface.

13. The heater of claim 12, wherein
the restraint operating part includes a female touch (Velcro®) fastener tape and a male touch fastener (Velcro®) tape installed to face each other at the longitudinal intermediate cutting surface.

14. The heater of claim 11, wherein
the heating wire is installed within each of the bi-directional segments.

15. The heater of claim 11, wherein
the heating wire is installed radially closer to the radially inner surface than the longitudinal intermediate cutting surface.

16. The heater of claim 11, wherein
the bi-directional segments are formed of a flexible material.

* * * * *